No. 748,277. PATENTED DEC. 29, 1903.
T. GIGUERE.
FASTENER.
APPLICATION FILED DEC. 26, 1902.
NO MODEL.

WITNESSES:
Ada E. Hagerty
Chas. H. Luther Jr.

INVENTOR:
Thomas Giguere
by Joseph A. Miller & Co.
ATTORNEYS.

No. 748,277. Patented December 29, 1903.

UNITED STATES PATENT OFFICE.

THOMAS GIGUERE, OF ATTLEBORO, MASSACHUSETTS, ASSIGNOR TO THE DAGGETT & CLAP COMPANY, OF ATTLEBORO, MASSACHUSETTS.

FASTENER.

SPECIFICATION forming part of Letters Patent No. 748,277, dated December 29, 1903.

Application filed December 26, 1902. Serial No. 136,534. (No model.)

*To all whom it may concern:*

Be it known that I, THOMAS GIGUERE, a citizen of the United States, residing at Attleboro, in the county of Bristol and State of Massachusetts, have invented a new and useful Improvement in Fasteners, of which the following is a specification.

This invention has reference to improvements in fasteners, and more particularly to improvements in that class of fasteners or clasps used to fasten neckties or to fasten articles secured to the fastener to the garment of the wearer. In fasteners or clasps of this nature the use of a spring or springs in the construction, as has heretofore been done, is detrimental to the use and life of the fastener by the spring or springs becoming bent or broken.

The object of my invention is to construct a fastener without the use of springs; and to accomplish this the invention consists in the peculiar and novel construction of the fastener whereby the fastening-arm is operated to open by the natural movement of the thumb and index-finger of the user in holding the fastener and to close by the operation of a lever, as will be more fully described hereinafter and pointed out in the claims.

Figure 1:
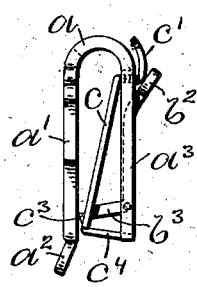
Figure 2:
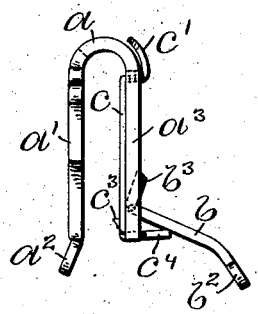
Figure 3:
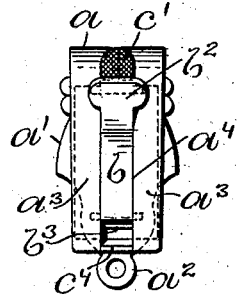
Figure 4:
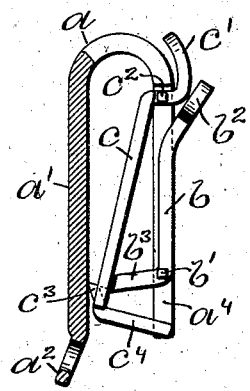
Figure 5:
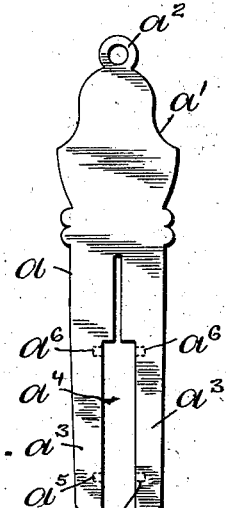
Figure 6:
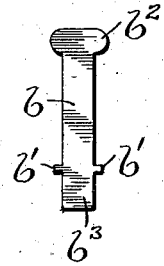
Figure 7:

Figure 1 is an edge view of my improved fastener, showing the fastener closed. Fig. 2 is an edge view showing the fastener open. Fig. 3 is a view looking at the back of the fastener, showing the locking-lever closed. Fig. 4 is an enlarged sectional view showing the fastening-arm and the locking-lever in their closed positions. Fig. 5 is a plan view of the blank forming the U-shaped frame of the fastener. Fig. 6 is a view of the blank forming the locking-lever, and Fig. 7 is a view of the blank forming the fastening-arm.

My improved fastener or clasp is composed of three parts—a frame having bearings for what I term the "clamping-arm" and a locking-lever or that part which operates on the clamping-arm to close and hold or lock the clamping-arm in the closed position.

In the drawings, $a$ is the U-shaped frame of the fastener, having the front $a'$, with the eye or ring $a^2$ for securing articles to the fastener. The front $a'$ may be ornamented, if desired. The two arms $a^3 a^3$ form the back of the fastener and are shaped to form the opening $a^4$ for the locking-lever and part of the clamping-arm.

Stamped in the edges of the arms $a^3 a^3$ in the opening $a^4$ are the bearings $a^5 a^5$ for the locking-lever and the bearings $a^6 a^6$ for the clamping-arm. The locking-lever $b$ operates in the opening $a^4$ and has the pivots $b' b'$ working in the bearings $a^5 a^5$, the outwardly-bent and enlarged end $b^2$, and the inwardly-bent end $b^3$ to engage with the clamping-arm. The clamping-arm $c$ is contracted to form the thumb-piece $c'$, with the pivots $c^2 c^2$ working in the bearings $a^6 a^6$, the stamped-up points $c^3$, to more securely hold the fastener, and the L-shaped end $c^4$, working in the opening $a^4$ in the frame to prevent side movement of the clamping-arm $c$. The clamping-arm thumb-piece $c'$ extends through the opening $a^4$ outward and is curved to correspond with the bend in the frame $a$, as shown in Fig. 4.

In the operation of my improved fastener the locking-lever $b$ is opened. This carries the end $b^3$ of the locking-lever outward, releasing the clamping-arm $c$, and by the natural movement of the thumb or finger on the thumb-piece $c'$ of the clamping-arm $c$ in holding the fastener the clamping-arm is opened. The fastener is now placed on the article to which it is to be secured and the locking-lever $b$ is closed. The inwardly-extending end $b^3$ of the locking-lever forces the clamping-arm $c$ inward and extending by the pivots $b' b'$ locks the fastener in the closed position.

Having thus described my invention, I claim as new and desire to secure by Letters Patent—

In a fastener for the purpose described, a U-shaped frame forming the front $a'$ with the eye or ring $a^2$ and the arms $a^3 a^3$ forming the opening $a^4$, the locking-lever $b$ pivotally secured to the frame in the opening $a^4$ and having the outwardly-bent and enlarged end $b^2$ and the inwardly-bent end $b^3$, the clamping-arm $c$ pivotally secured to the frame in the opening $a^4$ and having the outwardly-extending and curved thumb-piece $c'$, the stamped-up points $c^3$ and the L-shaped end $c^4$ extending into the opening $a^4$, all for the purpose as described.

In witness whereof I have hereunto set my hand.

THOMAS GIGUERE.

Witnesses:
B. S. WEBSTER,
J. A. MILLER, Jr.